Oct. 23, 1956     H. A. LESHER     2,768,272
APPARATUS FOR HEAT-SEALING THERMOPLASTIC MATERIAL
Filed Dec. 24, 1952
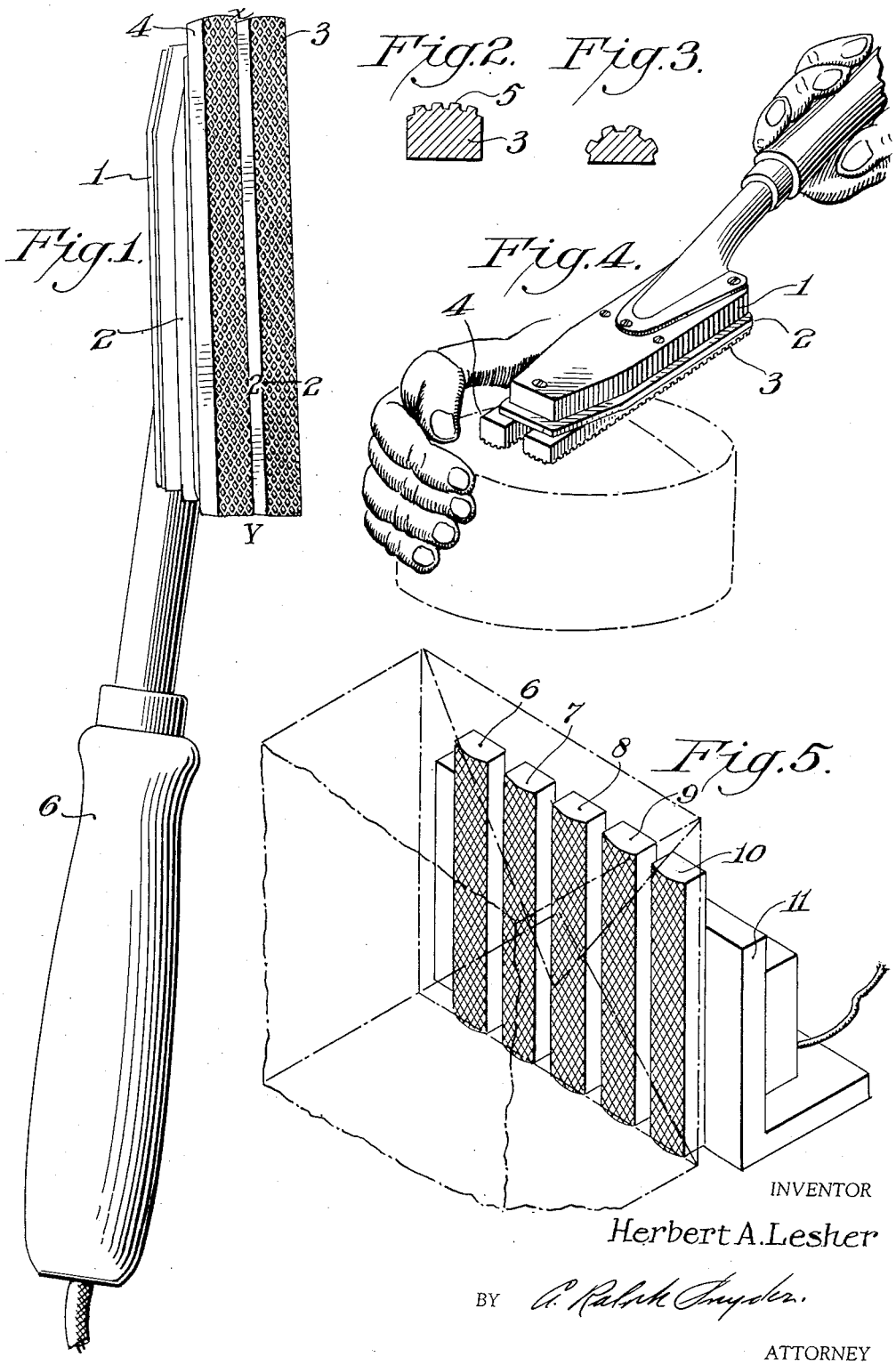
INVENTOR
Herbert A. Lesher
BY
ATTORNEY

United States Patent Office 2,768,272
Patented Oct. 23, 1956

2,768,272

APPARATUS FOR HEAT-SEALING THERMOPLASTIC MATERIAL

Herbert A. Lesher, Wilmington, Del., assignor to E. I. du Pont de Nemours and Company, Wilmington, Del., a corporation of Delaware Application December 24, 1952, Serial No. 327,720

2 Claims. (Cl. 219—19)

This invention relates to a process and apparatus for heat-sealing wrapping tissue of thermoplastic films and, more particularly, to a process and apparatus for heat-sealing such films around irregularly-shaped resilient, compressible articles.

Normally, when heat-sealing polymeric thermoplastic films of polyethylene, rubber hydrochloride, polyvinylidene chloride, polyethylene terephthalate, etc., it has been found desirable to incorporate a cooling period in the cycle of any continuous or semi-continuous apparatus used for such purpose in order to allow the seal to set and regain its strength after being brought to the sealing temperature. For example, in continuous processes of heat-sealing, a cooling period may be provided by passing the sealed film over a cool drum or plate whereby heat is extracted from the sealed area and the bond is set to attain maximum strength. In other apparatus for continuous sealing, the film may merely be passed through a short air space to facilitate cooling before it is subjected to any tension or contact with another object. However, in hand wrapping of various articles in polymeric thermoplastic films, the necessity of a positive cooling step after a seal is made complicates the general hand wrapping procedure and adds to the time involved to complete the wrapping of a package. Hence, it is desirable to be able to fold a film around an article, heat-seal the required overlapping edges, and proceed with other necessary handling whether it be additional folding, stacking the wrapped package for shipping or carrying to display areas. Handling the wrapped package immediately after heat-sealing the wrapping material requires that the heat seals be set to the point of being able to withstand stresses imposed by such after-handling. Consequently, these seals must cool rapidly, which means that heat must be conducted rapidly away from the sealed areas.

In the case of sealing films wrapped about regularly shaped articles which present a smooth, relatively non-resilient, non-compressible surface, the film lies in close contact or flush against the article being packaged, and such contact normally serves to conduct heat away from the film at the sealed areas. On the other hand, in the case of heat-sealing films about irregularly-shaped, resilient, compressible articles, such as bed sheets, pillow cases, other types of textiles, slices and cuts of meats, etc., the lack of uniform contact between the article and the wrapping film generally results in overheating the film in sealed areas where the article does not contact the film while there is substantially adequate dissipation of heat from adjacent contacting areas. Hence, in attempting to heat-seal a wrapping film, especially polyethylene film, about such types of articles with a relatively smooth and flat heat-sealing element, e. g., heat-sealing bar, the resulting seal is generally puckered and/or torn, e. g., in and adjacent to areas where overheating occurs; and the net result is a seal which is unsatisfactory from the standpoint of strength and general appearance.

It is an object of the present invention to provide an apparatus for heat-sealing a polymeric, thermoplastic wrapping film about an irregularly-shaped, resilient, compressible article, and obtain a heat-seal of strength and appearance satisfactory for commercial packaging. Other objects will be apparent from the description presented hereinafter.

These objects are accomplished in accordance with the present invention by contacting the film wrapper in areas to be sealed with a heat source having its contacting surface convex in contour and knurled over the entire surface which contacts the film.

The term "knurled" will be used hereinafter to mean that the entire surface of the heat-sealing element which contacts the film is composed of a multiplicity of closely-spaced, raised areas, these areas being non-interconnecting. Generally, the raised areas present a contacting surface area which is in the shape of a regular geometric pattern, for example, a multiplicity of circles, squares, diamonds, hexagons, or rectangles. Also, the raised areas may be in the form of pyramids, in which instance the contacting surfaces would be a multiplicity of points. On the other hand, the contacting surfaces may be a multiplicity of irregular shapes. In all cases, however, the contacting areas are non-interconnecting.

The present invention is premised on the discovery that the use of a knurled, convex, heat-sealing surface raises the temperature of the film being sealed to the sealing temperature in a multiplicity of non-interconnecting areas. Consequently, adjacent areas, i. e., those which are opposite the depressed areas of the heat-sealing element, are not heated to the sealing temperature; and, thus, a lattice of film having a substantial portion of its original strength is formed within the sealed area. Furthermore, heat from the adjacent sealed areas is permitted to dissipate rapidly not only into the air and/or into any portions of the contained article which may be contacting a sealed area, but also into the adjacent non-sealed areas. In addition, the convex surface of the heat-sealing element provides for avoiding contacting the film surface with a continuous heated surface, i. e., any continuous heated surface which would produce a continuous seal. For example, if the surface of a sealing bar were knurled but substantially flat, the longitudinal edges of the bar would contact the film, especially when sealing the film over an irregularly-shaped, resilient, compressible article; and two continuous linear seals would be produced. Such seals along a continuous line produce puckering along the entire seal and, in most instances, the film is overheated to the extent that the sealing element melts through.

Preferred embodiments of the apparatus and process of the present invention will now be described with reference to the accompanying drawings wherein:

Figure 1 is a view, in perspective, of an electrically heated, hand sealing unit comprising two heat-sealing bars, each bar, in accordance with this invention, having a convex, knurled (i. e., having a multiplicity of raised diamond-shaped areas) sealing surface;

Figure 2 is a cross-sectional view on the line 2—2 of Figure 1;

Figure 3 is a cross-sectional view of a modified form of heat-sealing bar;

Figure 4 illustrates the sealing of a typical package using a hand seal device of the type illustrated in Figure 1; and Figure 5 is a perspective view of an arrangement of sealing bars especially adapted for the sealing of the ends of packages.

Referring to Figure 1, the hand sealing device comprises a body portion 1 of any suitable structural material to which is affixed a heater shoe or plate 2 heated by suitable electric resistance or like heating units (not shown). Mounted on shoe 2 and in heat conductive relation thereto are two parallel, spaced sealing bars 3 and 4 of heat conductive material (e. g., aluminum, copper, iron, etc.). Each bar is characterized by a convex seal-in surface which is knurled to provide a plurality of raised, preferably geometrically symmetrical areas 5. A handle 6 attached to the body portion 1 completes the assembly.

The sealing bar illustrated in Figure 1 may be employed in situations wherein the sealing bar is not embedded or pressed into the article being wrapped to any appreciable extent (Figure 4). In other words, this bar would be used for sealing the ends of various packages containing textile materials such as bed sheets and/or pillow cases. On the other hand, for sealing various irregular shapes, such as various cuts of meat, a sealing bar having a semi-cylindrical cross-section, such as shown in Figure 3, would probably be preferred in order that the sealing bar might be pressed substantially into the article being wrapped in order to form a secure seal over irregular surface areas, and still avoid the danger of contacting the film with a continuous heated surface such as would be formed by contact with the side edge X—Y of the bar illustrated in Figure 1. For example, pressing the sealing bar of Figure 1 against and into a compressible article to such an extent that line X—Y contacts the surface of a polyethylene film, a thin, elongated seal is made which forms a continuous line of demarkation between sealed and unsealed areas; and the film adjacent to this line is highly puckered. Furthermore, in some cases the longitudinal edges of the sealing bar, i. e., the edges formed by the juncture of the convex surface and a flat surface (as illustrated by line X—Y of Figure 1) actually causes overheating of the film and and subsequent melting through. Hence, depending upon the particular shape of the packages being sealed, the radius of curvature and length of the arc of the convex sealing surface should be so designed that there is little or no danger of contacting the film surface with a continuous heated surface.

In the modification shown in Figure 5, a plurality of parallel, spaced heating bars 6, 7, 8, 9, and 10, of the design illustrated in Figure 1 are mounted vertically on an electrically heated shoe 11. An arrangement of this type is especially useful for sealing the end folds of packages which are simply pressed against the bars, as illustrated, until the seal is made.

The knurled, convex sealing surface of the heat-sealing element is generally pressed upon the film surface so that maximum pressure upon the film surface is exerted at the crest of the arc of the convex surface; and as a result of employing a sealing element of such contour, the pressure upon the film is less in areas extending away from the area of the film contacted by the crest of the convex surface.

The general appearance of the imprinted seal upon the film surface will vary from that of the pattern of the knurled sealing surface depending upon the temperature of the sealing bar, pressure applied, dwell time, and resiliency and/or compressibility of the article being packaged. Generally, seals of most satisfactory appearance are those which substantially duplicate the general pattern of the knurled surface of the sealer; but during hand packaging operations, the pressure and dwell time will vary as will the shape and compressibility of the articles being packaged.

The radius of curvature of the convex surface of the sealing bar may be varied in accordance with the type of articles being packaged, i. e., degree of irregularity of shape, and the resiliency and compressibility of the article. In all cases, however, the convex contour serves to present a rounded sealing surface to the film so that the maximum seal strength is along a center line longitudinally of the seal, i. e., where the crest of the convex surface contacts the surface of the film. From this longitudinal center line extending outward along the width of the seal, the imprinted pattern left by the sealing bar tapers off, owing to the convex surface; and, consequently, the seal strength tapers off somewhat from that along the longitudinal center line. As discussed hereinbefore, the use of a convex sealing surface substantially eliminates producing seals along a continuous line, thereby producing a seal composed of a multiplicity of non-interconnecting sealed areas.

The following examples further illustrate the practice and principles of the present invention:

Example 1

An electrically heated sealing iron of the type illustrated in Figure 1 was heated to a temperature of about 175° C. (347° F.). Two bed sheets folded in like manner were stacked and wrapped in a film of polyethylene 0.002" thickness. The initial longitudinal seal was made along overlapping edges of the film on a major flat surface of the stack. Thereafter, both ends of the package were closed by impressing the sealing iron against the film in the areas wherein the film was folded and overlapped properly to close the ends of the package. In all cases, a neatly appearing, strong seal was made; and substantially immediately after sealing the package, it could be dropped to the floor without rupturing any of the seals.

With the knurled texture and convex contour of the sealing surface, good seals may be made by employing sealing temperatures above the melting point of the polymeric film; i. e., in the case of polyethylene film, this is about 104° C. Obviously, at sealing temperatures at the melting point or just above, a longer dwell time is required; and usually, somewhat greater pressure should be applied during the sealing.

Example 2

A multiplicity of heat-sealing bars of the type illustrated in Figure 1 were mounted in a vertical position in a manner illustrated in Figure 5. As described in Example 1, a stack of two bed sheets was wrapped in a sheet of polyethylene 0.002" thickness, and the initial longitudinal seal of the package was made with the heat-sealing iron described in Example 1. Thereafter, the ends of the package were folded and overlapped, and the end seals were then made by pushing the ends of the package against the row of heat-sealing bars at 300° F. (spaced 1/8" apart) as illustrated in Figure 4. The resulting end seals were neat in appearance, the pattern of seal being similar to that of the knurled surface of the sealing bar, and the seals were of good strength.

The apparatus and process of the present invention is entirely satisfactory for sealing wrapping films of polymeric thermoplastic materials around articles which present a relatively regular, smooth, substantially non-compressible surface under the layers of film being sealed. However, the apparatus is particularly outstanding, as discussed herein, for sealing films over relatively irregularly-shaped, resilient, compressible articles which cannot be readily sealed with heat-sealing apparatus employed hereinbefore, especially the conventional heat-sealing bar having a flat, smooth sealing surface. Furthermore, the present apparatus is particularly outstanding for sealing polyethylene film around such articles. Sealing polyethylene film around packages is particularly troublesome because of excessive puckering which occurs in the sealed areas, and this is believed to be due mainly to overheating as a result of nonuniform and slow dissipation of heat from the sealed areas. In other words, the puckering appears to be caused by either a release of strains already present in the polyethylene film or the setting up of new strains within the film in the areas heated to sealing temperatures. Hence, contraction of the film in and adjacent to sealed areas causes excessive puckering in and adjacent to the sealed areas; and by employing the apparatus and process of the present invention, the areas of the film to be sealed are heated in a multiplicity of non-interconnecting areas instead of heating the entire area of the film being sealed. This type of sealing results in a substantial reduction in the amount of puckering at the sealed areas and, consequently, results in heat seals of neat appearance and good strength.

As many widely differing embodiments may be made without departing from the spirit and scope of my invention, it is to be understood that said invention is in no wise restricted except as set forth in the appended claims.

I claim:

1. A device for heat-sealing the wrapper of packages wrapped with thermoplastic wrapping material which comprises in combination a plurality of elongated bars of heat conductive material, a plate arranged to support said bars in parallel relationship and substantially in the same plane, said bars being stationary with respect to said plate, and means to heat said bars, each of said bars having a convex face adapted to contact the wrapper, said face being knurled to present a plurality of raised contacting areas.

2. The device of claim 1 wherein the heating means is electrical.

References Cited in the file of this patent

UNITED STATES PATENTS

| | | |
|---|---|---|
| 665,575 | Muggenburg | Jan. 8, 1901 |
| 985,467 | Speer | Feb. 28, 1911 |
| 2,119,358 | Scharf | May 31, 1938 |
| 2,262,480 | Waters | Nov. 11, 1941 |
| 2,376,253 | Humphrey | May 15, 1945 |
| 2,430,920 | Dodge | Nov. 18, 1947 |
| 2,443,749 | Stunkel | June 22, 1948 |
| 2,468,965 | Ekstrom | May 3, 1949 |
| 2,469,972 | Lowry et al. | May 10, 1949 |
| 2,596,933 | Kirk | May 13, 1952 |
| 2,610,137 | Williamson et al. | Sept. 9, 1952 |

FOREIGN PATENTS

| | | |
|---|---|---|
| 264,471 | Switzerland | Jan. 3, 1950 |